United States Patent
Charpentier et al.

(10) Patent No.: US 9,891,612 B2
(45) Date of Patent: Feb. 13, 2018

(54) INTERMEDIATE LINEAR POSITIONING

(71) Applicant: Hand Held Products, Inc., Fort Mill, SC (US)

(72) Inventors: Anthony Raymond Charpentier, Corronsac (FR); Alain Gillet, Toulouse (FR)

(73) Assignee: Hand Held Products, Inc., Fort Mill, SC (US)

( * ) Notice: Subject to any disclaimer, the term of this patent is extended or adjusted under 35 U.S.C. 154(b) by 297 days.

(21) Appl. No.: 14/704,050

(22) Filed: May 5, 2015

(65) Prior Publication Data

US 2016/0327930 A1 Nov. 10, 2016

(51) Int. Cl.
*G05B 19/40* (2006.01)

(52) U.S. Cl.
CPC .... *G05B 19/40* (2013.01); *G05B 2219/42203* (2013.01)

(58) Field of Classification Search
CPC .. G02B 15/00–15/28; G02B 7/00–7/40; G03B 2205/00–2205/0092
See application file for complete search history.

(56) References Cited

U.S. PATENT DOCUMENTS

| | | | |
|---|---|---|---|
| 5,546,238 A * | 8/1996 | Devenyi | G02B 7/10 359/694 |
| 6,832,725 B2 | 12/2004 | Gardiner et al. | |
| 7,128,266 B2 | 10/2006 | Marlton et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 7,953,319 B2 * | 5/2011 | Tanimura | G02B 7/08 310/307 |
| 8,294,969 B2 | 10/2012 | Plesko | |
| 8,317,105 B2 | 11/2012 | Kotlarsky et al. | |
| 8,322,622 B2 | 12/2012 | Suzhou et al. | |
| 8,366,005 B2 | 2/2013 | Kotlarsky et al. | |

(Continued)

FOREIGN PATENT DOCUMENTS

| | | |
|---|---|---|
| WO | 2013163789 A1 | 11/2013 |
| WO | 2013173985 A1 | 11/2013 |

(Continued)

OTHER PUBLICATIONS

Office Action in counterpart UK Application No. GB1607592.1 dated Nov. 1, 2016, pp. 1-6.

(Continued)

*Primary Examiner* — Bumsuk Won
*Assistant Examiner* — Jeffrey Madonna
(74) *Attorney, Agent, or Firm* — Additon, Higgins & Pendleton, P.A.

(57) ABSTRACT

A system is described for positioning a load in of multiple positions disposed over a linear axis. A linear actuator moves the load into each of the positions. A first position is at an end of the movement, with a second position opposite. A third position is intermediate between the first and the second positions. A stop actuator is made of a configurable material switchable selectively between an engaged configuration, in which the load is positioned in the at least third position, and a disengaged configuration, in which the load is freely movable between the first and the second positions.

19 Claims, 10 Drawing Sheets

(56) References Cited

U.S. PATENT DOCUMENTS

| | | | |
|---|---|---|---|
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,736,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,863,913 B2 * | 10/2014 | Jang ................ G02B 7/08 188/71.1 |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Bremer et al. |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |

(56) References Cited

U.S. PATENT DOCUMENTS

| | | |
|---|---|---|
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 2003/0206736 A1* | 11/2003 | Nishina .............. G02B 15/173 396/72 |
| 2006/0098968 A1* | 5/2006 | Ito .................. G02B 7/023 396/85 |
| 2006/0208609 A1* | 9/2006 | Heim ................ F04B 43/0054 310/311 |
| 2007/0063048 A1 | 3/2007 | Havens et al. |
| 2008/0212212 A1 | 9/2008 | Matsuki et al. |
| 2009/0134221 A1 | 5/2009 | Zhu et al. |
| 2009/0168198 A1* | 7/2009 | Perreault ............ F03G 7/065 359/694 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0106936 A1* | 5/2012 | Lim .................. G03B 5/02 396/55 |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |

(56) References Cited

U.S. PATENT DOCUMENTS

| | | |
|---|---|---|
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

U.S. Appl. No. 13/367,978, filed Feb. 7, 2012, (Feng et al.); now abandoned.

U.S. Appl. No. 14/462,801 for Mobile Computing Device With Data Cognition Software, filed Aug. 19, 2014 (Todeschini et al.); 38 pages.

U.S. Appl. No. 14/596,757 for System and Method for Detecting Barcode Printing Errors filed Jan. 14, 2015 (Ackley); 41 pages.

U.S. Appl. No. 14/277,337 for Multipurpose Optical Reader, filed May 14, 2014 (Jovanovski et al.); 59 pages.

U.S. Appl. No. 14/200,405 for Indicia Reader for Size-Limited Applications filed Mar. 7, 2014 (Feng et al.); 42 pages.

U.S. Appl. No. 14/662,922 for Multifunction Point of Sale System filed Mar. 19, 2015 (Van Horn et al.); 41 pages.

U.S. Appl. No. 14/446,391 for Multifunction Point of Sale Apparatus With Optical Signature Capture filed Jul. 30, 2014 (Good et al.); 37 pages.

U.S. Appl. No. 29/528,165 for In-Counter Barcode Scanner filed May 27, 2015 (Oberpriller et al.); 13 pages.

U.S. Appl. No. 29/528,890 for Mobile Computer Housing filed Jun. 2, 2015 (Fitch et al.); 61 pages.

U.S. Appl. No. 14/614,796 for Cargo Apportionment Techniques filed Feb. 5, 2015 (Morton et al.); 56 pages.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 14/578,627 for Safety System and Method filed Dec. 22, 2014 (Ackley et al.); 32 pages.

U.S. Appl. No. 14/573,022 for Dynamic Diagnostic Indicator Generation filed Dec. 17, 2014 (Goldsmith); 43 pages.

U.S. Appl. No. 14/529,857 for Barcode Reader With Security Features filed Oct. 31, 2014 (Todeschini et al.); 32 pages.

U.S. Appl. No. 14/519,195 for Handheld Dimensioning System With Feedback filed Oct. 21, 2014 (Laffargue et al.); 39 pages.

U.S. Appl. No. 14/519,211 for System and Method for Dimensioning filed Oct. 21, 2014 (Ackley et al.); 33 pages.

U.S. Appl. No. 14/519,233 for Handheld Dimensioner With Data-Quality Indication filed Oct. 21, 2014 (Laffargue et al.); 36 pages.

U.S. Appl. No. 14/533,319 for Barcode Scanning System Using Wearable Device With Embedded Camera filed Nov. 5, 2014 (Todeschini); 29 pages.

U.S. Appl. No. 14/748,446 for Cordless Indicia Reader With a Multifunction Coil for Wireless Charging and EAS Deactivation, filed Jun. 24, 2015 (Xie et al.); 34 pages.

U.S. Appl. No. 29/528,590 for Electronic Device filed May 29, 2015 (Fitch et al.); 9 pages.

(56) References Cited

OTHER PUBLICATIONS

U.S. Appl. No. 14/519,249 for Handheld Dimensioning System With Measurement-Conformance Feedback filed Oct. 21, 2014 (Ackley et al.); 36 pages.
U.S. Appl. No. 29/519,017 for Scanner filed Mar. 2, 2015 (Zhou et al.); 11 pages.
U.S. Appl. No. 14/398,542 for Portable Electronic Devices Having a Separate Location Trigger Unit for use in Controlling an Application Unit filed Nov. 3, 2014 (Bian et al.); 22 pages.
U.S. Appl. No. 14/405,278 for Design Pattern for Secure Store filed Mar. 9, 2015 (Zhu et al.); 23 pages.
U.S. Appl. No. 14/590,024 for Shelving and Package Locating Systems for Delivery Vehicles filed Jan. 6, 2015 (Payne); 31 pages.
U.S. Appl. No. 14/568,305 for Auto-Contrast Viewfinder for an Indicia Reader filed Dec. 12, 2014 (Todeschini); 29 pages.
U.S. Appl. No. 29/526,918 for Charging Base filed May 14, 2015 (Fitch et al.); 10 pages.
U.S. Appl. No. 14/580,262 for Media Gate for Thermal Transfer Printers filed Dec. 23, 2014 (Bowles); 36 pages.
U.S. Appl. No. 14/519,179 for Dimensioning System With Multipath Interference Mitigation filed Oct. 21, 2014 (Thuries et al.); 30 pages.
U.S. Appl. No. 14/264,173 for Autofocus Lens System for Indicia Readers filed Apr. 29, 2014, (Ackley et al.); 39 pages.
U.S. Appl. No. 14/453,019 for Dimensioning System With Guided Alignment, filed Aug. 6, 2014 (Li et al.); 31 pages.
U.S. Appl. No. 14/452,697 for Interactive Indicia Reader, filed Aug. 6, 2014, (Todeschini); 32 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 14/715,916 for Evaluating Image Values filed May 19, 2015 (Ackley); 60 pages.
U.S. Appl. No. 14/513,808 for Identifying Inventory Items in a Storage Facility filed Oct. 14, 2014 (Single et al.); 51 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 14/483,056 for Variable Depth of Field Barcode Scanner filed Sep. 10, (McCloskey 2014 et al.); 29 pages.
U.S. Appl. No. 14/531,154 for Directing an Inspector Through an Inspection filed Nov. 3, 2014 (Miller et al.); 53 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 14/676,327 for Device Management Proxy for Secure Devices filed Apr. 1, 2015 (Yeakley et al.); 50 pages.
U.S. Appl. No. 14/257,364 for Docking System and Method Using Near Field Communication filed Apr. 21, 2014 (Showering); 31 pages.
U.S. Appl. No. 14/327,827 for Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for 21, 2014 Terminal Having Illumination and Focus Control filed May 21, 2014 (liu et al.); 31 pages.

U.S. Appl. No. 14/619,093 for Methods for Training a Speech Recognition System filed Feb. 11, 2015 (Pecorari); 35 pages.
U.S. Appl. No. 29/524,186 for Scanner filed Apr. 17, 2015 (Zhou et al.); 17 pages.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/614,706 for Device for Supporting an Electronic Tool on a User's Hand filed Feb. 5, 2015 (Oberpiller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 for Intermediate Linear Positioning filed May 5, 2015 (Charpentier et al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User's Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/535,764 for Concatenated Expected Responses for Speech Recogintion filed 2014 (Braho et al.); 51 pages.
U.S. Appl. No. 14/687,289 for System for Communication Via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/695,923 for Secure Unattended Network Authentication filed Apr. 24, 2015 (Kubler et al.); 52 pages.
U.S. Patent Application No. 14/740,373 for Calibrating a Volume Dimensioner filed Jun. 16, 2015 (Ackley et al.); 63 pages.
Office Action in counterpart UK Application No. GB1607592.1 dated Sep. 28, 2017, pp. 1-3.
Combined Search and Examination Report in UK Application No. GB1707795.9; dated Dec. 11, 2017, pp. 1-6.
Examination Report in counterpart UK Application No. GB1607592.1 dated Dec. 11, 2017, pp. 1-5.

* cited by examiner

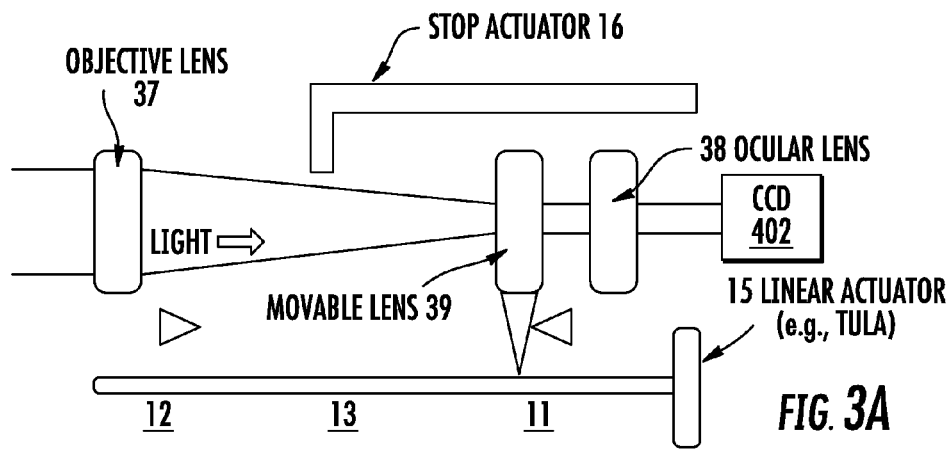
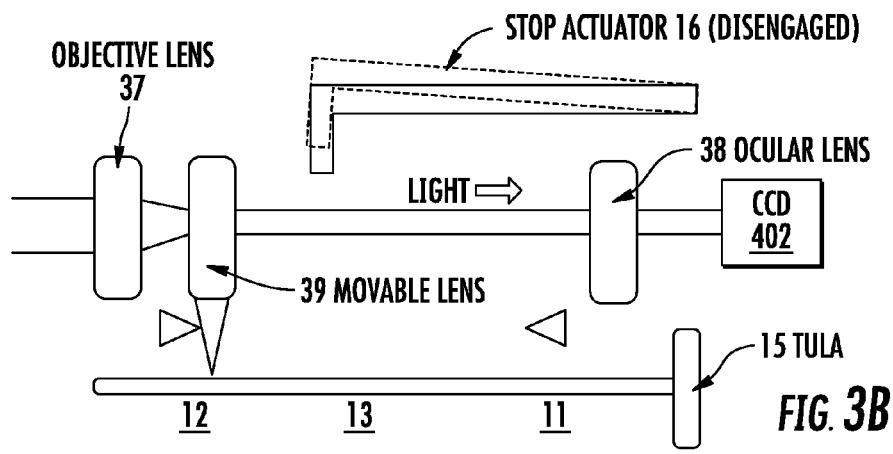
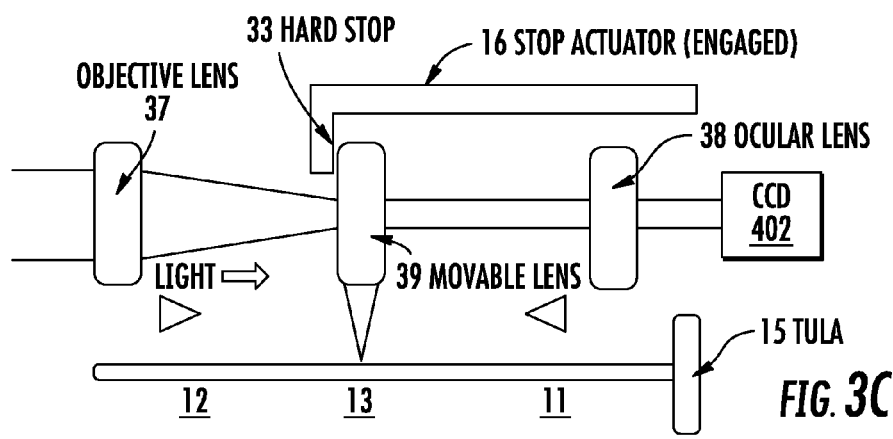

EXAMPLE FORMED SMA STOP ACTUATOR 50

SMA IN 'ENAGAGED' CONFIGURATION 51

EXAMPLE FORMED SMA STOP ACTUATOR 50

SMA IN 'DISENAGAGED' POSITION 52

INTERMEDIATE LINEAR POSITIONING

TECHNOLOGY FIELD

The present invention relates generally to positioning items. More specifically, an embodiment of the present disclosure relates to an intermediate linear positioning of loads by a linear positioning system.

BACKGROUND

Generally speaking, linear positioning is useful in a number of technical, industrial and commercial applications. For example, linear positioning of lenses provides zoom focus capability in scanners, which may be used for reading bar code patterns and documents, from which data presented in two dimensional (2D) graphic media may be accessed.

Linear position control is provided by systems that have actuation components ("linear actuators"). The simplest linear actuators move a load item ("load") from a first position to a second position along an axis of translational motion. The load may also be moved from the second position to the first position.

Some linear actuators may thus be operable in a forward direction (from the first position to the second position) and a reverse direction (from the second position to the first position). Somewhat more complex linear actuator may move the load, forward and reverse, between the first and the second positions, and to one or more additional positions.

For example, linear actuators used with three (3) position mechanical zoom move the load to a third position. The third position may be disposed along the translational axis at an intermediate point between the first position and the second position, which thus correspond to opposite extremes of movement of the load.

The actuator may move the load back and forth between hard stops at each of the first and the second positions, but not beyond either. Further, the actuator may move the load to a hard stop at the intermediate third position, from which it may then move the load to either of the first or the second positions.

The hard stops comprise positions at which the movement of the load is stopped and temporarily constrained from moving further in either direction. The hard stops of the first and the second positions are disposed at opposite fixed positions along the axis, which the linear actuator is constrained not to exceed.

The hard stop of the third position may correspond to a particular intermediate location as precise as the fixed locations of the first and the second positions. However, the actuator is operable for moving the load from the stop at the third intermediate position to the first and/or to the second position.

Lacking the fixed locations of the first and the second positions, the location of the intermediate third position must be designated with a precision level sufficient for a given use application. Effectively reliable linear positioning demands consistent repeatability in the achieving the sufficient precision level.

To attain the consistent repeatability, one or more additional position indicating components ("position sensors") may typically be used with the linear positioning system. The position sensors are operable for designating the precise location along the linear translational axis at which to stop the load in the intermediate position.

As the actuator moves the load over the linear axis, the position sensor tracks the load's changing position. Upon sensing that the load has been moved into the precise intermediate position, the motion of the load may be selectively stopped, and held in that position for as long a duration as may be selected.

Stopping the load in the first position and the second position is relatively simple, as these opposite motion limits are fixed. The complexity level rises significantly however in relation to stopping the load at the comparatively non-fixed intermediate third position. For example, the sensor first tracks the load as it is moved by the actuator.

Responsive to detecting that the load reaches the intermediate position, the sensor functions to trigger a stoppage of the motion of the load in that position. However, effects such as latency related to combining the operations of the position sensor and triggering the stop may impact the achievable precision level and/or its repeatability.

Moreover, the addition of the position sensors adds cost and complexity to the linear positioning systems. In addition to the impacted precision or reliability, the increased complexity of the linear positioning systems may add concomitant reliability issues or exacerbate existing ones associated therewith.

The additional cost and complexity associated with adding the position sensors to the linear positioning systems may be prohibitive for use in some applications. For example, 3-position mechanical zoom features may add significant functionality to simple, inexpensive optical scan engines, if sufficient precision is achievable consistently.

The linear position control in these scan engines must function at a designated level of precision and repeatability in delineating the intermediate position for stopping the movement of the load by the linear actuators. However, adding position sensors to the linear positioning systems of such scanners raises their cost and complexity prohibitively.

Moreover, latency and other precision and repeatability related effects added by the use of the position sensors with the linear positioning systems may also complicate their design and construction. The added complication may, of course, raise costs further and pose concomitant additional reliability issues.

SUMMARY

Therefore, a need exists for moving a load along a linear axis, over which the load may be stopped at least one position disposed at an intermediate point between opposing motion limit positions. A need also exists for moving the load bi-directionally along the linear axis between the at least one intermediate position and the positions of either of the motion limits and to stop at any of the positions, within a repeatable level of precision sufficient for a given use application. Further, a need exists for stopping the movement of the load at the intermediate position, within the sufficient repeatable precision level, independent of any dedicated position sensors.

Accordingly, in one aspect, the present invention embraces a system is described for positioning a load in of multiple positions disposed over a linear axis. A linear actuator moves the load into each of the positions. A first position is at an end of the movement, with a second position opposite. A third position is intermediate between the first and the second positions. A stop actuator is made of a configurable material switchable selectively between an engaged configuration, in which the load is positioned in the at least third position, and a disengaged configuration, in which the load is freely movable between the first and the second positions.

In an example embodiment, the system is used in an optical apparatus, such as a scanner for bar codes and/or other sources of 2D graphic data. The apparatus comprises an assembly of lenses, in which a movable lens comprises the load. The system is operable for positioning the movable lens in the first or second positions, which correspond respectively to an extended range and an 'HD' range of high definition and near-field and far-field reading of high density bar codes.—

An example embodiment may be implemented in which the switchably configurable material comprises an electro-active polymer (EAP), which may be active electostrictively. An example embodiment may also be implemented in which the switchably configurable material comprises a shape-memory alloy (SMA). The SMA material may be drawn into a wire or another structure.

In another aspect, the present invention embraces a zoom component, such as for use as a component in an optical or other apparatus.

In an example embodiment, the optical apparatus comprises a scanner for bar codes or other 2D graphic data.

In yet another aspect, the present invention embraces a method for adjusting a focus range of an optical apparatus such as a scanner. A linear actuator is actuated, which is operable for impelling a motion of a movable lens of the optical apparatus over a linear translational axis between a first position on the axis and a second position opposite therefrom. The first and the second positions each comprise limits of the motion of the movable lens in respective opposite directions over the axis.

The method also comprises selectively disengaging a stop actuator, in which the motion of the load is unconstrained between the first the second positions. The method also comprises selectively disengaging a stop actuator, in which the motion of the load is unconstrained between the first the second positions. Positioning the movable lens in the second position corresponds to operating the scanner in the HD focus range.

Further, the method comprises selectively engaging the stop actuator. The engaged stop actuator is operable for positioning the movable lens in at least an intermediate third position disposed along the axis between the first and the second positions. Positioning the movable lens in the intermediate position corresponds to operating the scanner in an SR focus range

BRIEF DESCRIPTION OF THE DRAWINGS

FIG. 3A and FIG. 3B each depict an example scanner with a movable lens positioned at respective opposite motion limits, according to an example embodiment;

FIG. 3C depicts the example scanner with a movable lens positioned at an intermediate position, according to an example embodiment;

DETAILED DESCRIPTION OF EXAMPLE EMBODIMENTS

Figure 1:
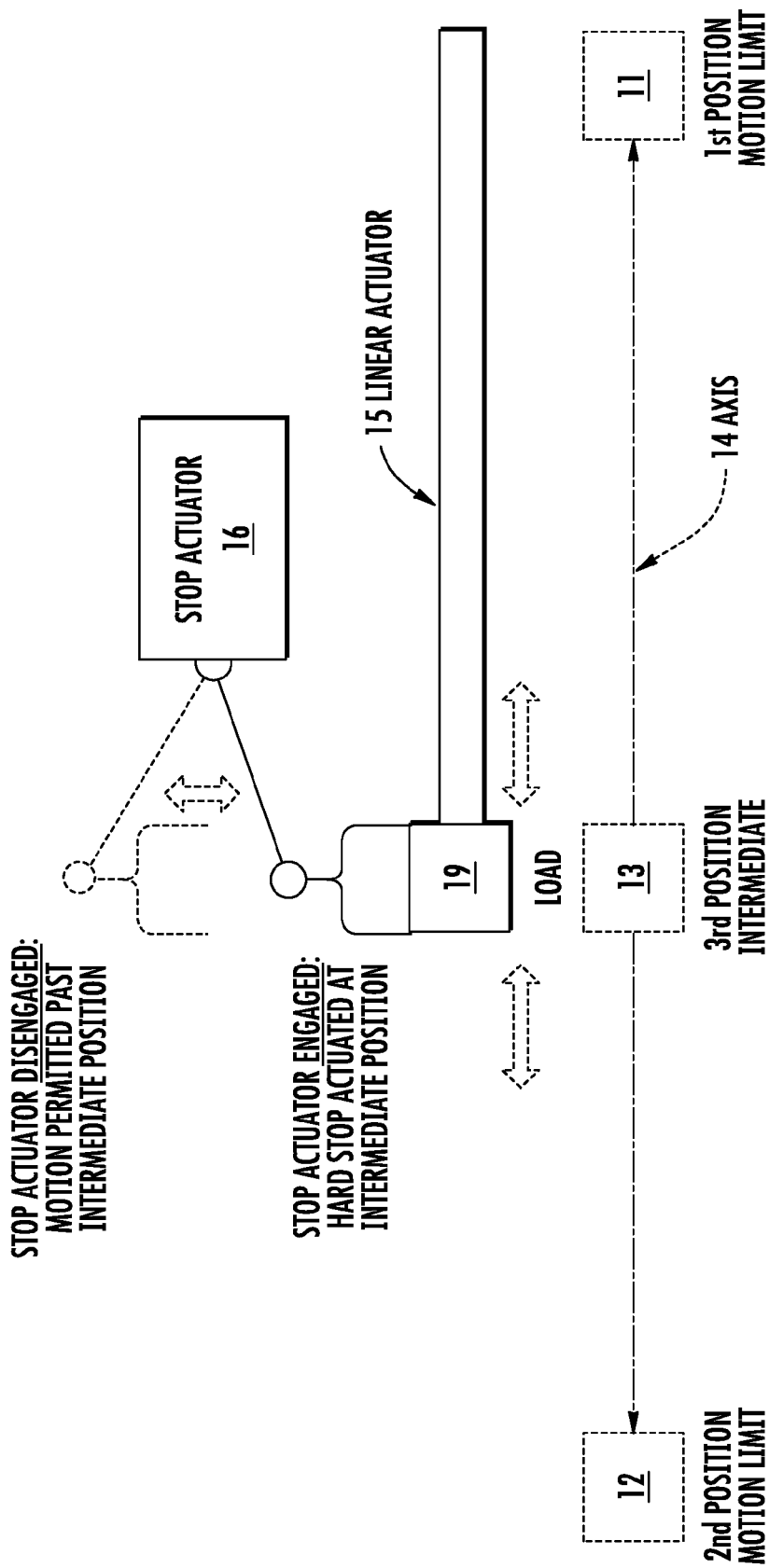
FIG. 1 depicts an example linear positioning system, according to an embodiment of the present invention.

The present invention embraces moving a load along a linear axis and stopping the load at one or more intermediate positions disposed between opposite motion limit positions. An example embodiment relates to moving the load bi-directionally along the linear axis between the one or more intermediate positions and the positions of either of the motion limits and stopping the load at any of these positions, within a repeatable level of precision sufficient for a given use application. Moreover, example embodiments stop the movement of the load at the one or more intermediate positions, within the sufficient repeatable precision level, without using a dedicated position sensor.

An example embodiment is described in relation to a system for positioning a load in of multiple positions disposed over a linear axis. A linear actuator moves the load into each of the positions. A first position is at an end of the movement in a first direction, with a second position opposite. A third position is intermediate between the first and the second positions. A stop actuator is made of a configurable material switchable selectively between an engaged configuration, in which the load is positioned in the at least third position, and a disengaged configuration, in which the load is freely movable between the first and the second positions. The load may comprise a movable lens in an optical assembly (e.g., zoom focus) or an apparatus (e.g., a scanner).

To achieve the desired levels of zoom in an optical apparatus, or indeed a desired outcome in any application, example embodiments of the present disclosure allow the actuation functions of linear positioning systems to position items moved therewith within a narrow band of precision, and do so repeatedly.

Scanners are used for reading bar code patterns, imaging documents and accessing 2D data presented with other graphic media. The scanners, and various other optical apparatus, function with associated systems of lenses, operable for collecting and focusing light. Such lens systems have at least a first lens and an image sensor-side lens.

An embodiment of the present invention relates to an optical apparatus and/or a scanner with multiple focusable fields of view (e.g., "zoom") using a lens system. One or more features of the optical apparatus, the scanner and/or the lens assembly may be implemented as described in U.S. Patent Application Publication No. 2014/0084068 by Gillet, et al., which is incorporated by reference for all purposes as if fully set forth herein and any patent(s) that may subsequently or eventually issue in relation thereto.

The first lens is stationary and oriented towards a target object. The first lens thus gathers light incident thereto. The incident light comprises a light beam emitted or reflected by the target object. The first lens focuses the incident light beam upon a focal point disposed along a longitudinal axis of the lens system.

Rays of the beam diverging from the focus are then captured and re-focused by a second sensor side lens upon an image sensor such as a charge coupled device (CCD) image detector array, a complementary metal oxide semiconductor (CMOS) image sensor array, or a detector comprising a photodiode (PD) array. The second sensor side lens is stationary (or perhaps movable only minimally).

A third lens is disposed between the first lens and the second sensor side lens. The third lens is moveable to various positions, which are disposed between the first lens and the second sensor side lens.

Foci of the lens system are adjusted to achieve desired levels of zoom. The foci are adjusted by controlling the position of the moveable third lens, relative to the stationary first lens and second sensor side lens. The movable lens position may be adjusted using a linear positioning system.

An Example Linear Positioning System

FIG. 1 depicts an example linear positioning system 10, according to an embodiment of the present invention. Linear positioning system 10 is operable for moving a load 19, such as a movable lens in an optical zoom lens assembly, over a linear axis of motion 14. Linear positioning system 10 comprises a linear actuator component 15. The linear actuator 15 is operable, controllably, for moving the load 19 into a plurality of positions disposed over the linear axis 14, which relates to a motion of the load 19. The plurality of positions comprises a first position 11 and a second position 12. The moving of the load 19 and/or one or more other operations and other features of the linear positioning system 10 may be implemented, for example, according to one or more features described in U.S. Pat. No. 8,976,368, by El Akel, et al., which is incorporated by reference herein in its entirety and for all purposes.

The first position 11 is disposed at a first end of the linear axis 14, which corresponds to a limit of the motion of the load 19. The second position 12 is disposed at a second end, opposite to the first end, of the linear axis 14, which corresponds to a limit of the motion of the load 19 in a second direction of motion opposite to the first direction of motion. The plurality of positions also comprises at least a third position 13 disposed along the linear axis at an intermediate point between the first position and the second position.

A stop actuator component 16 of the system 10 comprises a switchably configurable material. The configurable material switches, selectively, between a first 'disengaged' configuration and a second 'engaged' configuration. In the disengaged (first) configuration, the motion of the load is unconstrained between the first position 11 and the second position 12. In the engaged (second) configuration, the stop actuator 16 is operable for a stopping the motion of the load 19 in the at least third position, where the load 19 remains while the stop actuator 16 is operably engaged.

The linear actuator component 15 may comprise a tiny ultrasonic linear actuator (TULA) device. The switchably configurable material may comprise a metallic composition or a polymeric composition. An example embodiment may be implemented in which the switchably configurable material of the stop actuator 16 comprises an electroactive polymer (EAP) such an electrostrictive polymer. An example embodiment may also be implemented in which the switchably configurable material comprises a shape-memory alloy (SMA). A form of the SMA material may be fabricated as a gate structure, or as a wire structure.

In an example embodiment, the load 19 comprises a movable lens in a zoom focus element of an optical apparatus. The zoom focus element is operable selectively over an HD focus range of high definition and near-field and far-field reading of high density bar codes.

The zoom focus element comprises a first lens, fixed in proximity to the second position, and an image sensor-side lens, fixed in proximity to the first position. The position in which the movable lens is stopped corresponds to the focus range selected, over which the zoom focus is operable.

For example, upon a stop of the movable lens in the first position, the zoom element is operable in the ER. Upon a stop of the movable lens in the second position, the zoom element is operable in the SR. Upon the stopping the motion of the load in the at least third position, the zoom element is operable in the HD focus range. The stop actuator 16 is operable for stopping the movable lens in the intermediate position with a level of precision sufficient for use in repeatably accurate and reliable optical scan operations, without cost and/or complexity associated with alternative use of intermediate position indicating means.

Linear positioning system 10 may comprise one or more additional stop actuator components and the plurality of positions may comprise one or more respectively corresponding intermediate positions along the linear axis 14. The additional intermediate positions are disposed between the third position and either the first position, or the second position. Each of the additional stop actuator components comprises one of the switchably configurable materials, and each is operable in its engaged (second) configuration for stopping the motion of the load 19 at the respectively corresponding additional position.

Figure 2:
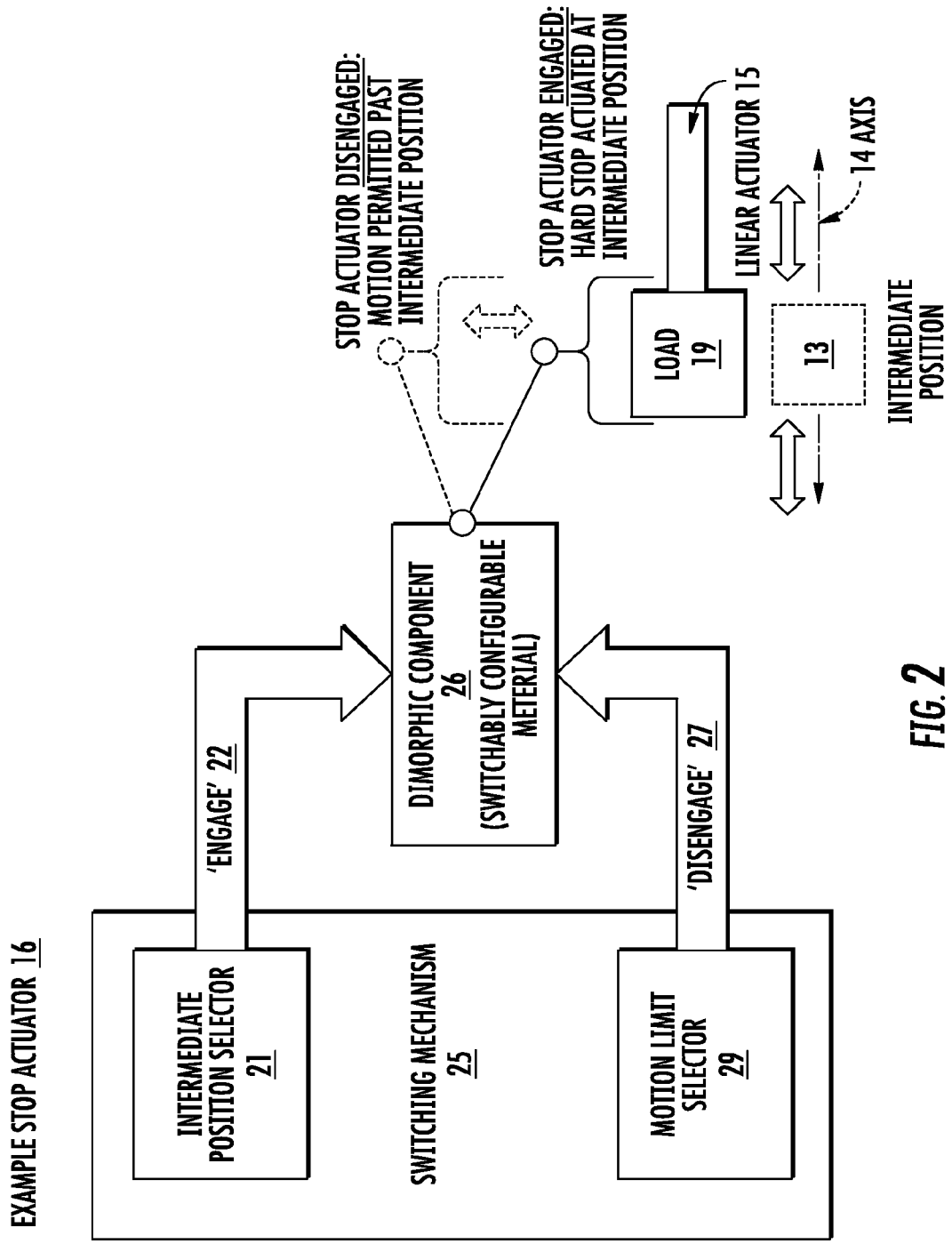
FIG. 2 depicts an example stop actuator component for the linear positioning system, according to an example embodiment of the present invention.

FIG. 2 depicts an example stop actuator component 16 for the linear positioning system 10, according to an example embodiment of the present invention. The stop actuator 16 comprises a switching mechanism 25 and a dimorphic component 26. The dimorphic component 26 comprises a switchably configurable material 26, such as an SMA or an EAP. The switching mechanism 25 is operable as an intermediate position selector 21 and as a selector 29 of the motion limits.

With the motion limit selection 29, the switching mechanism 25 switches the configurable material 25 into a 'disengage' configuration 27. Thus, the stop actuator 16 is disengaged and freely allows the load 19 to move, unconstrained, between the first position 11 and the second position 22, or vice versa.

With the intermediate position selection 21, the switching mechanism 25 switches the configurable material 25 into an 'engage' configuration 22. Thus, the stop actuator 16 is engaged and stops the load 19 in the intermediate position.

Switching the dimorphic material 26 between the engage configuration and the disengage configuration comprises selectively changing its shape between each of two contours respectively corresponding to each.

With EAP materials, the switching mechanism 25 is operable for selectively changing the shape of the dimorphic material by varying an electrostatic field in which the EAP is disposed piezoelectrically. With SMA materials, the switching mechanism 25 is operable for selectively changing the shape of the dimorphic material between a native, initial and/or non-deformed contour and a deformed contour by means of a thermomechanical mechanism.

As used herein, the term 'thermomechanical' refers to mechanical means (e.g., deformation, spring loading), used in combination with heating and cooling. The thermomechanical mechanism manipulates the internal microstructure and corresponding metallurgical characteristics of the SMA material. The thermomechanical mechanism, for example, effectuates transitions between austenite and martensite crystal lattice structures of the SMA, which change the shape of the dimorphic component 25.

Selecting for the linear actuator 15 to position the load 19 in the first position 11 or the second position 12, the motion limit selector 29 is operable for switching the configurable material 26 of stop actuator 16 accordingly. The switching mechanism 25 thus operates as the motion limit selector 29 to provide a 'disengage' selection 27, based on which the switchably configurable material 26 is switched to configure the stop actuator 16 to disengage. Disengaging the stop actuator 16 allows the linear actuator 15 to move the load 19 freely, unconstrained between the first position 11 and the second position 12.

Selecting for positioning the load 19 in the intermediate third position 13, the motion limit selector 29 is operable for switching the configurable material 26 of stop actuator 16 accordingly. The switching mechanism 25 operates as the intermediate position selector 21 to provide an 'engage' selection 22, based on which the switchably configurable material 26 is switched to configure the stop actuator 16 to engage. Upon engagement, the stop actuator 16 is operable for a stopping the motion of the load 19 in the at least third position 13, where the load 19 remains while the stop actuator 16 is operably engaged.

As the engagement of the stop actuator 16 halts the motion of the load 19 in the at least third position 13, where the load 19 remains while the stop actuator 16 is operably engaged, an example embodiment may thus be implemented to configure an SR focus range for the zoom focus element in the optical apparatus.

Thus, a system is described for positioning a load in of multiple positions disposed over a linear axis. A linear actuator moves the load into each of the positions. A first position is at an end of the movement, with a second position opposite. A third position is intermediate between the first and the second positions. A stop actuator is made of a configurable material switchable selectively between an engaged configuration, in which the load is positioned in the at least third position, and a disengaged configuration, in which the load is freely movable between the first and the second positions.

Example Optical Assembly

An example embodiment is described in relation to an optical assembly, which is adjustable, selectively, over at least three focus ranges. FIG. 3A and FIG. 3B each depict an example optical assembly 30 with a movable lens component 39 positioned at respective opposite motion limits 11 and 12, according to an example embodiment. FIG. 3C depicts the example optical assembly 30 with the movable lens component 39 positioned at an intermediate third position 13, according to an example embodiment. The movable lens 39 comprises a load (e.g., 19; FIG. 1, 2) of the optical assembly 30.

The optical assembly 30 comprises a first lens 37, which is fixed in proximity to the second position 12. The optical assembly 30 also comprises an image sensor-side ("ocular") lens 38 fixed in proximity to the first position 11, which is disposed at an opposite end of a linear axis of the optical assembly 30 from the first position and in proximity with an image detector 402, such as a CCD, etc.

Further, the optical assembly 30 comprises a lens 39, which is movable controllably over the linear axis between the first position 11 and the second position 12. Positioning the movable lens 39 in the second position 12 selects an HD focus range of high definition and near-field and far-field reading of high density bar codes for the optical assembly 30. Positioning of the movable lens 39 in the first position 11 selects an extended focus range (ER) of the optical assembly 30.

The third position 13 is disposed between the first position 11 and the second position 12. Positioning the movable lens 39 in the third position 13 selects a corresponding SR focus range.

In an example embodiment, one or more features of the optical assembly 30 may be implemented as described in the incorporated reference: U.S. Pat. Appl. Pub. No. 2014/0084068 by Gillet, et al.

The optical assembly 30 comprises a zoom mechanism operable for positioning the movable lens 39, selectively, over the first position 11, the second position 12, and the third position 13. The zoom mechanism comprises a linear actuator device 15, and a stop actuator device 16. The stop actuator device 16 comprises a switchably configurable material.

The switchably configurable material switches selectively between a first configuration and a second configuration. Switched into the first configuration, the motion of the movable lens 39 load is unconstrained between the first position 11 and the second position 12. In the second configuration, the motion of the movable lens is stopped, at least temporarily, in the third position 13.

The movable lens 39 comprises a load, which is positioned, selectively, by the linear actuator (e.g., TULA) 15 of an associated linear positioning system. The TULA 15 is operable for moving the moveable lens 39 into position 11, position 12 and position 13, which are disposed over an axis of translational operation of the TULA 15 within the optical assembly 30.

The first lens 37 gathers incident light, which it focuses into the optical assembly 30 along its longitudinal axis. The focused light is refocused by the movable lens 39 onto the ocular lens 38. The ocular lens 38 further refocuses the light onto the image detector 402. The image detector 402 may comprise a charge coupled device (CCD), complementary metal oxide semiconductor (CMOS), or photodiode (PD) array to allow capture of images scanned by the optical apparatus.

FIG. 3A depicts the movable lens 39 in a temporally initial location corresponding to the first position 11 proximate to the ocular lens 38, in which the optical assembly is configured operably for providing the ER zoom focus range.

In FIG. 3B, the stop actuator 16 is reconfigured into a deactivated configuration, in which the TULA 15 moves the movable lens 39 freely, without constraint by the stop actuator 16, into the second position 12 proximate to the first lens 39 in which the optical assembly is configured operably for providing the HD focus range.

FIG. 3C depicts the stop actuator 16 in an engaged configuration, in which a hard stop 33 is effectuated to stop the movable lens 39 in the intermediate position 13. The hard stop 33 is achieved with sufficient precision repeatedly, without associated intermediate position indicating means, so as to configure the optical assembly for providing the SR focus range. The optical assembly 30 may be operable for providing zoom focus functionality in an associated optical apparatus, such as a scanner.

Example Optical Apparatus

Figure 4:
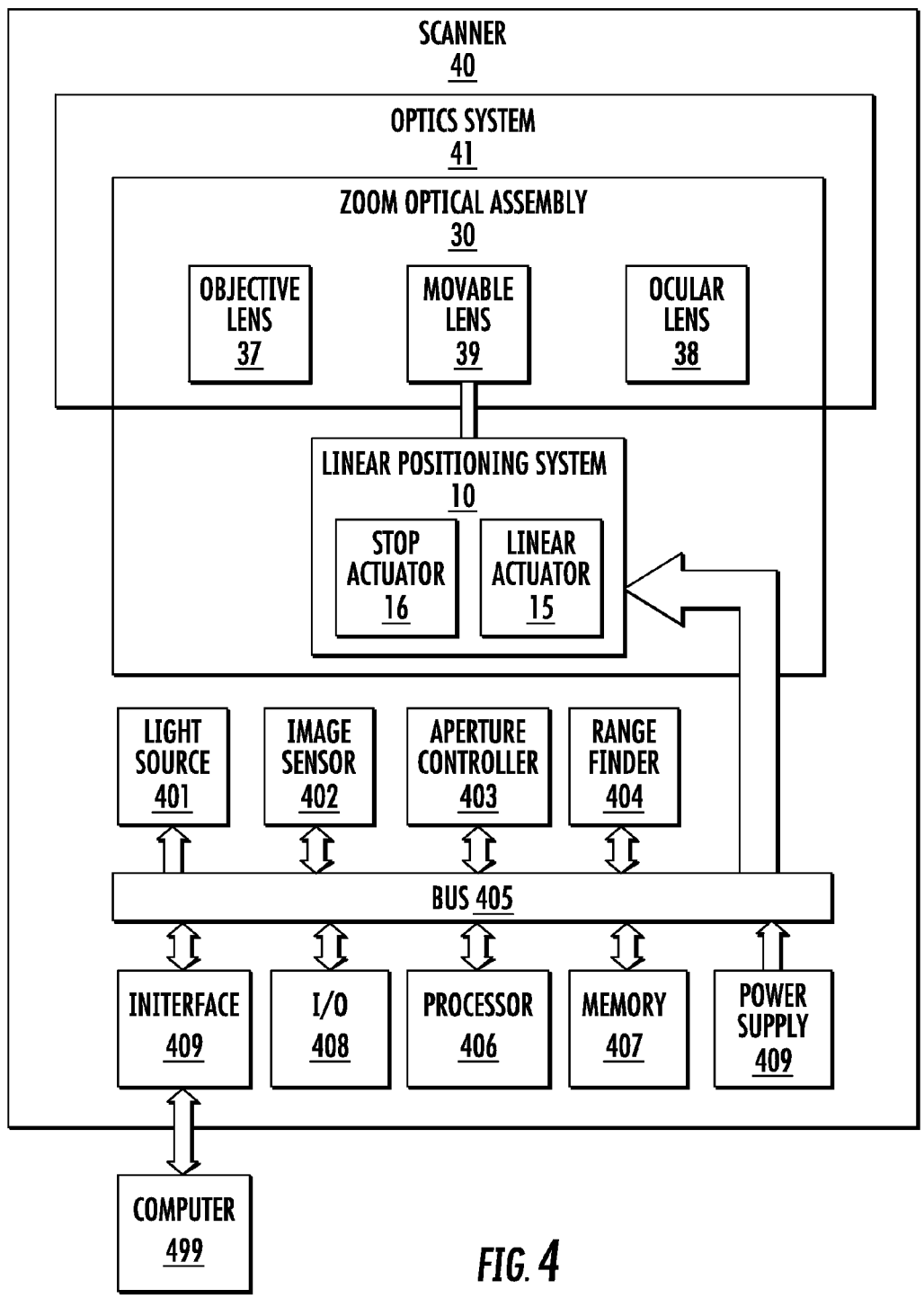
FIG. 4 depicts an example optical scanner apparatus, according to an example embodiment.

FIG. 4 depicts an example optical apparatus 40, according to an example embodiment. The optical apparatus 40 may comprise a scanner. The scanner may be operable for scanning (gathering, capturing, imaging) documents and/or other two dimensional (2D) arrays of graphic data such as Han Xin, QR, and/or dot code patterns, and UPC, PDF-417 (Portable Document File with four vertical bar symbols disposed over 17 horizontal spaces) and other bar code patterns ("barcodes").

The optical apparatus 40 comprises an optics system 41 with multiple lens components. The optics system 41 may also comprise other optical components, such as one or more prisms, mirrors and/or filters.

Among its multiple lens components, the optics system 41 comprises the first lens 37, the ocular lens 38 and the movable lens 39 of the zoom optical assembly 30. The movement and stops of the movable lens 39 are effectuated, respectively, by the linear actuator 15 and the stop actuator 16 of the linear positioning system 10.

An example embodiment may be implemented in which the selectively configurable material of the stop actuator 16 comprises an electroactive polymer (EAP), with functional electrostrictive properties. Example embodiments may also be implemented in which the selectively configurable material comprises a shape-memory alloy (SMA). The SMA may be fabricated into a functional wire-based structure or a formed structure, which may be operable as a mechanical gate, detent, or arrester.

In an example embodiment, one or more features of the optical apparatus 40 may be implemented as described in the incorporated reference: U.S. Pat. Appl. Pub. No. 2014/0084068 by Gillet, et al.

An example embodiment may be implemented in which the scanner 40 comprises a light source 401, the image sensor 402, an aperture controller 403, a range finder 404, one or more processors 406 (e.g., microprocessor or microcontroller), one or more memory (and/or other data storage) units 407, input/output (I/O) devices 408, an interface 409, and at least one power supply 409. The scanner 40 may also have a bus 405, which provides for the exchange of data signals between its other components. The bus 405 also allows for the power supply 409 to power the other components of the scanner 40.

The light source 401 comprises a laser, light emitting diode (LED), or another light emitter and is operable for illuminating barcodes, other symbols and data arrays, documents and other scan targets. The aperture controller 403 may comprises an iris or other device for setting a level of collimation for light gathered by the first lens for admission into the optics system 41. The range finder 404 may comprise radar, LIDAR (or other laser-related), or sonar related means, for determining a distance from the scanner 40 to a target scan object.

The one or more processors 405 may be used for running program applications associated with the scanner 40. The one or more memory units 407 may comprise any non-transitory computer readable storage medium, including random-access memory (RAM), read-only memory (ROM), any combination of volatile and non-volatile memory, and/or drive devices (e.g., hard drives and/or flash devices). The non-transitory computer readable storage media comprise instructions tangibly stored therewith, which when executed by the processor(s) 405, control processes for functions by which the scanner 40 is operable. The processes may comprise a method for adjusting a focus range of the zoom optical assembly 30.

The I/O devices 408 may comprise triggers for starting and stopping the scanner 40 and controlling the zoom optical system 30, including the linear positioning system 10. The triggers may also initiate or control other functions of the scanner 40. The interface 409 may comprise means for effectuating network interactions and/or communicative coupling, via wireless and/or wireline means, with an external computer 499 and with visual displays, audio transducers, and communication devices. The power supply 409 may comprise a battery and/or means for coupling to an external power source.

The scanner 40 may be implemented in a mobile, portable and/or handheld unit, a fixed or vehicle-mounted unit, a universal or other barcode reader. Additionally or alternatively, the scanner 40 may be implemented in a portable data terminal (PDT), mobile phones, smart phones, tablet computers, laptop computers, "Ultrabooks™," personal digital assistants (PDAs), vehicle-based computers, etc.

Figure 5A:
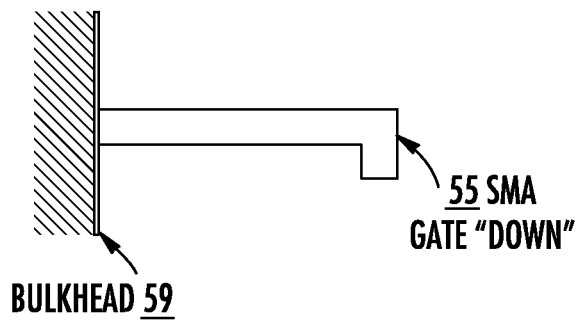
FIG. 5A and FIG. 5B each depict an example formed SMA stop actuator device in respective stop-engaged and disengaged configurations, according to an example embodiment.
Figure 5B:
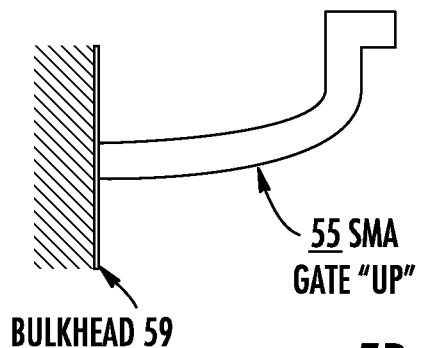

FIG. 5A and FIG. 5B each depict an example formed SMA stop actuator device 50 in respective stop-engaged and disengaged configurations 51 and 52, according to an example embodiment. The SMA device 50 comprises a gate component ("gate") 55, which is affixed ("anchored") at a first end to a fixed, rigid supporting, anchoring or foundation component ("bulkhead") 59.

The gate 55 comprises the switchably configurable SMA based material of the stop actuator device 50 and represents the dimorphic component (e.g., dimorphic component 26; FIG. 2) thereof. The rigid bulkhead 59 restrains the first end of the gate 55 from moving. A second end of the gate 55, opposite from the rigidly anchored first end, is operably moveable between a first position and a second position.

A switching mechanism (e.g., 25; FIG. 2) of the stop actuator is operable as an intermediate position selector 21 and as a motion limit selector (e.g., respectively: 21, 29; FIG. 2). The stop actuator 50 comprises the switching mechanism and a dimorphic component (e.g., 26; FIG. 2). The dimorphic component 26 comprises the switchably configurable SMA material. The switching mechanism (e.g., 25; FIG. 2) of the stop actuator 50 is operable as an intermediate position selector 21 and as a motion limit selector 29.

With the motion limit selector operable, the configurable material gate 55 is switched into a 'disengage' configuration. Thus, the stop actuator 50 is disengaged and freely allows a load (e.g., 19; FIG. 1, FIG. 2) to move in either direction, unconstrained, between its limits of motion (e.g., first and second positions 11, 12; FIG. 1).

With the intermediate position selector operable, the configurable material gate 55 is switched into an 'engage' configuration. Thus, the stop actuator 50 is engaged and is operable for stopping the load in the intermediate position.

Switching the dimorphic SMA material of the gate 55 between the engage configuration and the disengage configuration of the stop actuator 50 relates to selectively changing its shape between respective corresponding contours. With the SMA material of the gate 55, the switching mechanism of the stop actuator 50 is operable for selectively changing the shape of the dimorphic SMA material between a native, initial and/or non-deformed contour and a deformed contour by means of a thermomechanical mechanism.

FIG. 5A depicts the shape of the gate 55 in conformation with the first operational configuration of its SMA material, in which the stop actuator 50 has assumed an operably 'engaged' state 51.

FIG. 5B depicts the shape of the gate 55 in conformation with the first operational configuration of its SMA material, in which the stop actuator 50 has assumed an operably 'disengaged' state 51.

Figure 6B:
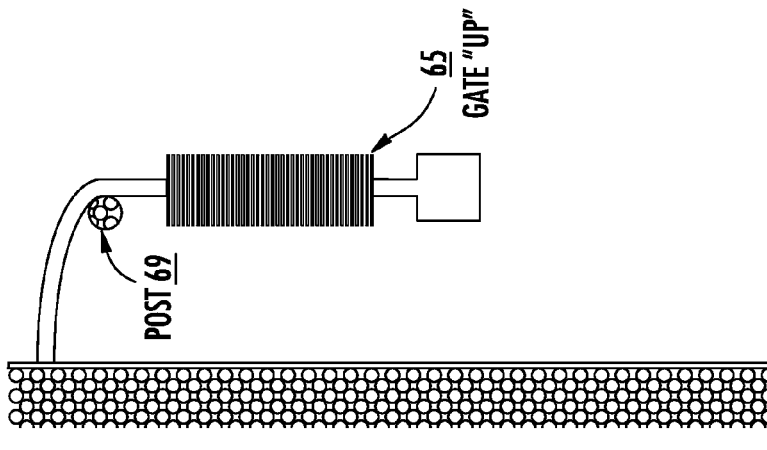
FIG. 6A and FIG. 6B each depict an example wire SMA stop actuator device in respective stop-engaged and disengaged configurations, according to an example embodiment.
Figure 6A:
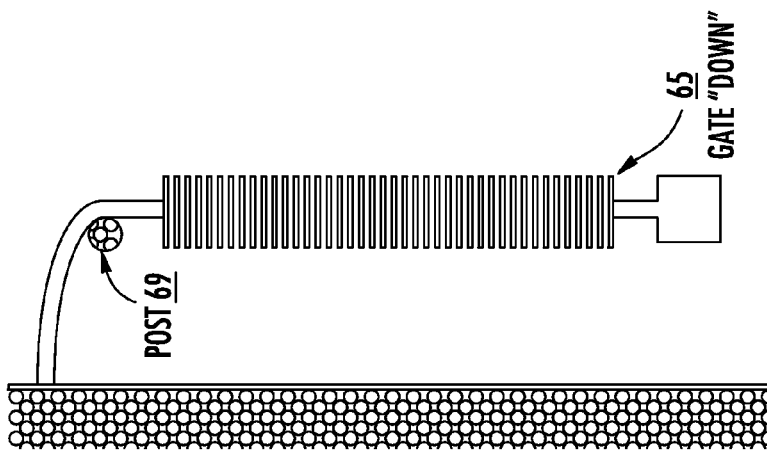

FIG. 6A and FIG. 6B each depict an example wire SMA stop actuator device 60 in respective stop-engaged and disengaged configurations 61 and 62, according to an example embodiment. The SMA device 60 comprises a wire like gate component ("gate") 65, which is affixed ("anchored") at a first end to a fixed, rigid supporting, anchoring or foundation component ("bulkhead") 69. A significant portion of the wire gate 65 may comprise a coil configuration, into which the wire material is coiled. A post 68 may function with the bulkhead 68 to support a portion of the gate 65.

The gate 65 comprises a wire form (e.g., including the coiled portion) of the switchably configurable SMA based material and represents the dimorphic component (e.g., dimorphic component 26; FIG. 2) thereof. The rigid bulkhead 69 and the post 68 restrain the first end of the wire SMA gate from moving. A second end of the wire SMA gate 65, opposite from the rigidly anchored first end, is operably moveable between a first position and a second position.

A switching mechanism (e.g., switching mechanism 25; FIG. 2) of the stop actuator is operable as an intermediate position selector and as a motion limit selector (e.g., respectively: 21, 29; FIG. 2). The stop actuator 60 comprises the switching mechanism and a dimorphic component, which comprises the SMA wire gate 55. The dimorphic component 26 comprises the switchably configurable material. The switching mechanism of the stop actuator 65 is operable as the intermediate position selector and as the motion limit selector.

With the motion limit selector operable, the configurable material gate 65 is switched into a 'disengage' configuration (e.g., 27). Thus, the stop actuator 50 is disengaged and freely allows a load (e.g., 19; FIG. 1, FIG. 2) to move in either direction, unconstrained, between its limits of motion (e.g., first and second positions 11, 12; FIG. 1).

With the intermediate position selector operable, the configurable SMA wire material gate 65 is switched into an 'engage' configuration. Thus, the stop actuator 60 is engaged and is operable for stopping the load in the intermediate position.

Switching the dimorphic SMA material of the gate 65 between the engage configuration and the disengage configuration of the stop actuator 60 relates to selectively changing its shape between respective corresponding contours.

With the SMA wire material of the gate 65, the switching mechanism of the stop actuator 60 is operable for selectively changing the shape of the dimorphic SMA material between a native, initial and/or non-deformed contour and a deformed contour by means of a thermomechanical mechanism.

FIG. 6A depicts the shape of the gate 65 in conformation with the first operational configuration of its SMA material, in which the stop actuator 50 has assumed an operably 'engaged' state 61.

FIG. 6B depicts the shape of the gate 65 in conformation with the first operational configuration of its SMA material, in which the stop actuator 60 has assumed an operably 'disengaged' state 61.

Figure 7A:
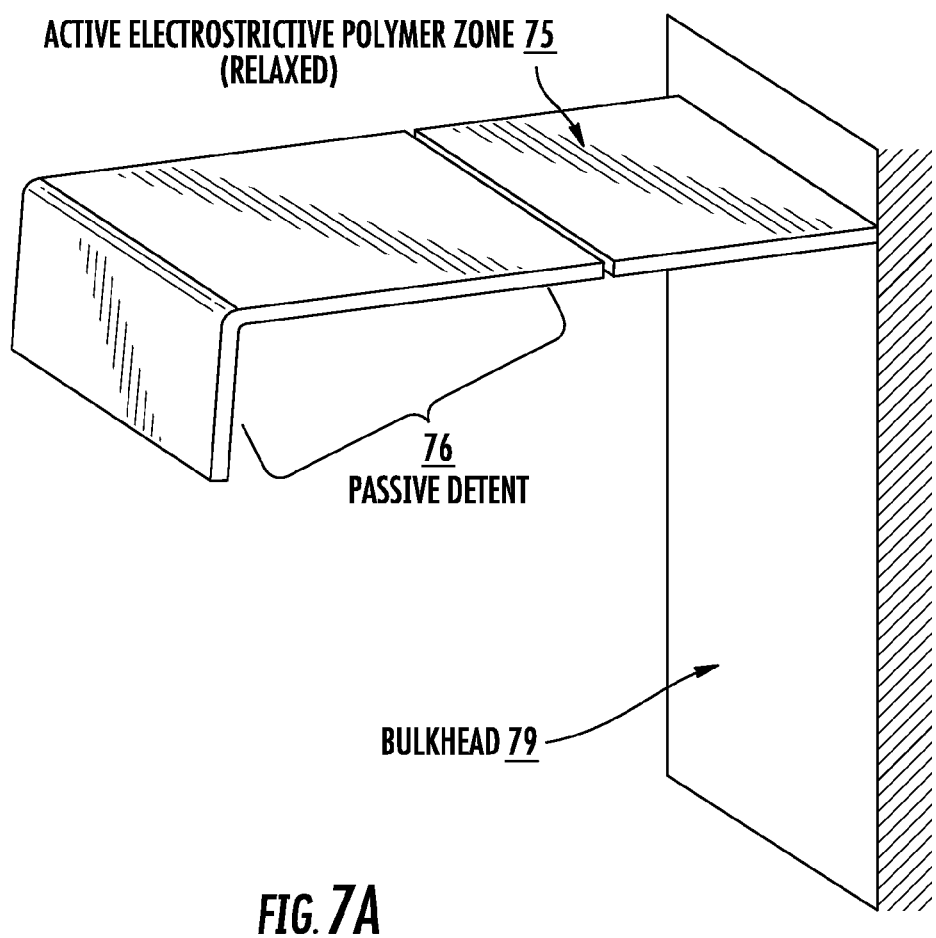
FIG. 7A and FIG. 7B each depict an example EAP stop actuator device in respective stop-engaged and disengaged configurations, according to an example embodiment.
Figure 7B:
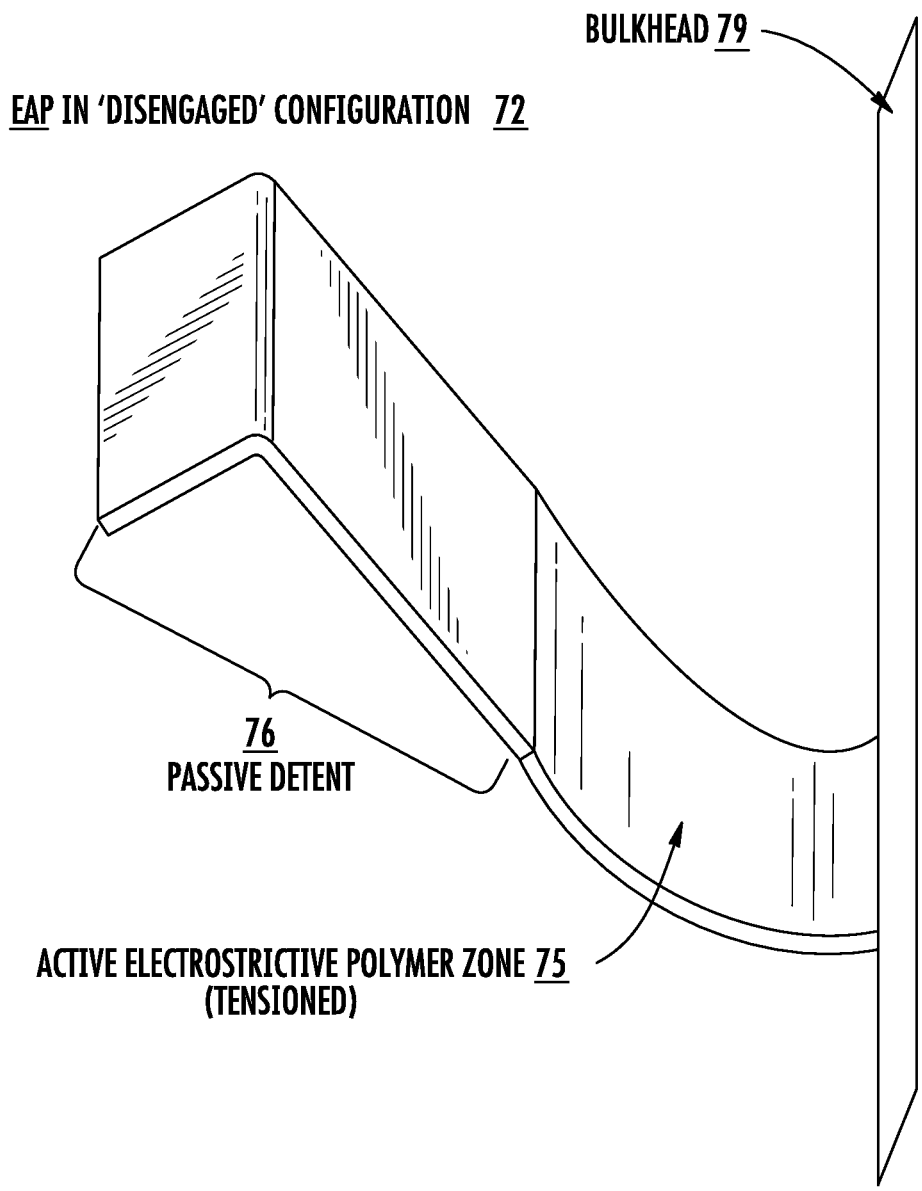

FIG. 7A and FIG. 7B each depict an example EAP stop actuator device 70 in respective stop-engaged and disengaged configurations 71 and 72, according to an example embodiment. The stop actuator 70 comprises an EAP gate component ("gate") 75, which is affixed ("anchored") at a first end to a fixed, rigid anchoring, supporting or foundation component ("bulkhead") 79.

The gate 75 comprises an electrostrictive polymer, fabricated into a switchably configurable EAP based dimorphic component (e.g., dimorphic component 26; FIG. 2) thereof. The rigid bulkhead 79 restrain the first end of the EAP gate 75 from moving. A second end of the EAP gate 75, opposite from the rigidly anchored first end, is operably moveable between a first position and a second position.

A switching mechanism (e.g., switching mechanism 25; FIG. 2) of the stop actuator is operable as an intermediate position selector and as a motion limit selector (e.g., respectively: 21, 29; FIG. 2). The stop actuator 70 comprises the switching mechanism and a dimorphic component, which comprises the EAP gate 75. The dimorphic component (e.g., 26; FIG. 2) comprises the electrostrictive switchably configurable polymer material. The switching mechanism (e.g., 25) of the stop actuator 75 is operable as the intermediate position selector and as the motion limit selector.

With the motion limit selector operable, the configurable EAP material gate 75 is switched into a 'disengage' configuration (e.g., 27). Thus, the stop actuator 70 is disengaged and freely allows a load (e.g., 19; FIG. 1, FIG. 2) to move in either direction, unconstrained, between its limits of motion (e.g., first and second positions 11, 12; FIG. 1).

With the intermediate position selector operable, the configurable EAP material gate 75 is switched into an 'engage' configuration. Thus, the stop actuator 70 is engaged and is operable for stopping the load in the intermediate position.

Switching the dimorphic SMA material of the gate 75 between the engage configuration and the disengage configuration of the stop actuator 70 relates to selectively changing its shape between respective corresponding contours.

With the electrostrictive EAP material of the gate 75, the switching mechanism of the stop actuator 70 is operable for selectively changing the shape of the dimorphic EAP material between a relaxed contour and a strained contour by varying an electrostatic field in which the dimorphic EAP component is disposed. An example embodiment may be implemented in which the electrostatic field is varied by a piezoelectric mechanism.

FIG. 7A depicts the shape of the gate 75 in conformation with the first operational configuration of its EAP material, in which the stop actuator 50 has assumed an operably 'engaged' state 71, corresponding to the relaxed contour state of the dimorphic component.

FIG. 7B depicts the shape of the gate 75 in conformation with the first operational configuration of its SMA material, in which the stop actuator 60 has assumed an operably 'disengaged' state 72, corresponding to the strained contour state of the dimorphic component.

Example N-Position Linear Positioning System

Figure 8:
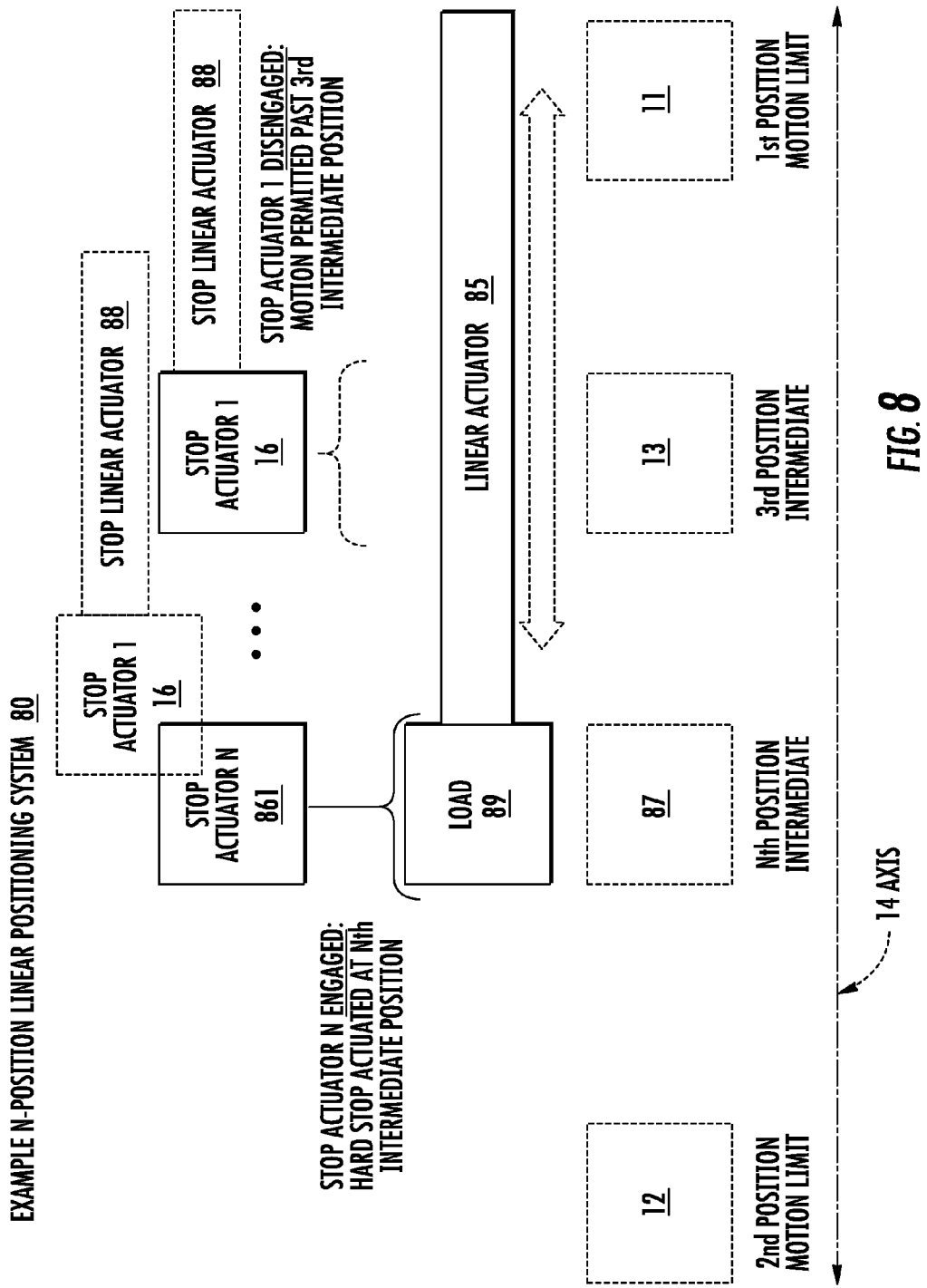
FIG. 8 depicts an example N-position linear positioning system, according to an embodiment.

FIG. 8 depicts an example N-position linear positioning system 80, according to an embodiment of the present invention. A portion of the N-position linear positioning system 80 may comprise, analogize or be represented by one or more features described above with reference to FIG. 1 and FIG. 2.

The linear positioning system 80 is operable for moving a load 89, such as a movable lens in an optical zoom lens assembly, over the linear axis of motion 14. The linear positioning system 80 comprises a linear actuator component 85. The linear actuator 85 is operable, controllably, for moving the load 89 into a plurality of positions disposed over the linear axis 14, which relates to a motion of the load 89. The plurality of positions comprises a first position 11 and a second position 12.

The first position 11 is disposed at the first end of the linear axis 14 and corresponding to a limit of the motion of the load 89 in a first direction. The second position 12 is disposed at a second end, opposite to the first end, of the linear axis 14 and corresponds to a limit of the motion of the load 89 in a second direction, opposite to the first direction of motion. The plurality of positions also comprises a third position 13 disposed along the linear axis at a first intermediate point between the first position 11 and the second position 12.

Further, the plurality of positions also comprises at least one additional intermediate position 87. The at least one additional intermediate position 87 is disposed along the linear axis 14 at one or more respective intermediate points between the third position 13 and the first position 11, or between the third position 13 and the second position 12. Thus, the plurality of positions may comprise a total number N of intermediate positions, in which 'N' comprises a positive whole number greater than or equal to one (1).

The stop actuator component 16 comprises the switchably configurable material. The configurable material switches, selectively, between the first disengaged configuration and the second engaged configuration. In the disengaged configuration, the motion of the load 89 is unconstrained between the first position 11 and the second position 12. In the engaged (second) configuration, the stop actuator 16 is operable for a stopping the motion of the load 89 in the at least third position, where the load 19 remains while the stop actuator 16 is operably engaged.

The linear positioning system 80 also comprises at least one additional stop actuator component 861, which corresponds respectively to the at least one additional position 87. Thus, the linear positioning system 80 may comprise a total number of stop actuator components equal to the respective number N of intermediate positions.

Like the stop actuator 16, the stop actuator 861 comprises the switchably configurable material and is operable in the second configuration thereof for stopping the motion of the load 89 in the at least one additional position 87 corresponding respectively thereto.

Like the stop actuator 16, the stop actuator component 861 comprises the switchably configurable EAP or SMA material. The configurable material switches, selectively, between the first disengaged configuration and the second engaged configuration. In the disengaged configuration, the motion of the load 89 is unconstrained between the first position 11 and the second position 12. In the engaged configuration, the stop actuator 861 is operable for a stopping the motion of the load 89 in the at least one additional position 87, where the load 89 remains while the stop actuator 861 is operably engaged.

The linear actuator component 85 may comprise a TULA device. The switchably configurable material of the stop actuators 861 and 16 may the EAP composition or the SMA composition. The form of the SMA material may be fabricated as the formed gate structure, or as the wire structure.

In an example embodiment, the load 89 comprises a movable lens in a zoom focus element of an optical apparatus such as a scanner. The zoom focus element is operable selectively over the SR, the ER, and the HD focus range, as well as at least one additional range. The zoom focus element comprises the first lens, fixed in proximity to the second position, and the second sensor side lens, fixed in proximity to the first position. The position in which the movable lens load 89 is stopped corresponds to the focus range selected, over which the zoom focus is operable.

For example, upon the stop of the movable lens load 89 in the first position 11, the zoom element is operable in the ER. Upon the stop of the movable lens in the second position 12, the zoom element is operable in the HD focus range. Upon the stopping the motion of the movable lens 89 in the intermediate position 13, the zoom element is operable in the SR focus range.

Upon the stopping the motion of the movable lens 89 in the at least one intermediate position 87, the zoom element is operable in the at least one additional focus range. The stop actuators 861 and 16 are operable for stopping the movable lens in the intermediate positions 87 and 13, respectively, with a level of precision sufficient for use in repeatably accurate and reliable optical scan operations, without cost and/or complexity associated with alternative use of intermediate position indicating means.

The linear positioning system 80 may comprise one or more additional stop actuator components and the plurality of positions may comprise one or more respectively corresponding intermediate positions along the linear axis 14. The further additional intermediate positions are disposed between the third position and either the first position, or the second position. Each of the additional stop actuator components comprises one of the switchably configurable materials, and each is operable in its engaged configuration for stopping the motion of the load 89 at the respectively corresponding additional position.

An example embodiment may be implemented, alternatively, with a single stop actuator. For example, the stop actuator 16 may be moved from the first position 11 by a stop actuator linear positioning system 88. The stop actuator linear positioning system 88 may also comprise a TULA.

Figure 9:
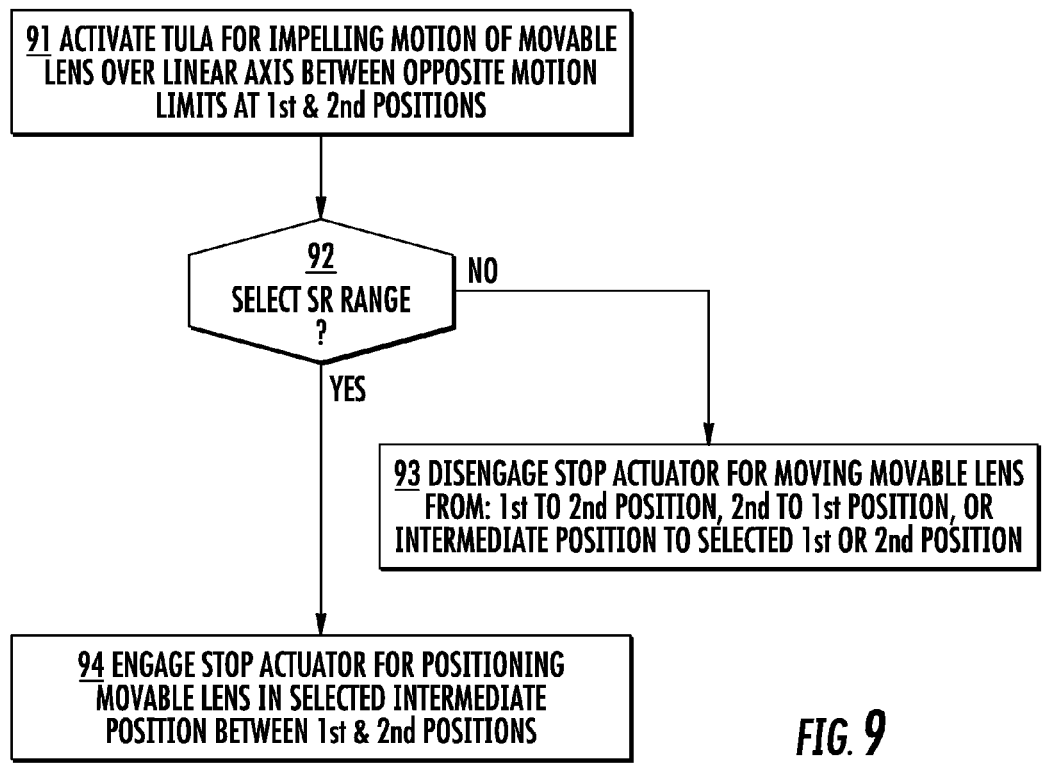
FIG. 9 depicts a flowchart for an example linear positioning process, according to an embodiment of the present invention.

FIG. 9 depicts a flowchart for an example linear positioning process 90, according to an embodiment of the present invention. The process 90 is used for positioning a moveable lens for selecting a variety of focal ranges available from a zoom focus assembly in an optical apparatus such as a scanner.

In a step 91, a linear actuator such as a TULA is activated for impelling a motion of a movable lens over a linear translational axis between first and second positions. The first and second positions are disposed at opposite ends of the axis and correspond to respective limits of the motion of the lens in opposite directions.

With the movable lens positioned in the first position, the zoom focus assembly provides an extended focus range (ER). With the movable lens positioned in the second position, the zoom focus assembly provides an HD. With the movable lens positioned in the intermediate position between the first and second positions, the zoom focus assembly provides an SR focus range.

In a step 92, it is determined whether the SR range is being selected.

If the SR focal range is not selected, then in a step 93, a stop actuator is disengaged and the movable lens is moved freely by the TULA, unconstrained from the first position to the second position, from the second position to the first position, or from an intermediate position to either the first or the second positions.

If the SR range selected, then in a step 94, the stop actuator is engaged for positioning the movable lens in a selected intermediate position between the first and the second positions. The selected SR focus range provides both near-field and far-field reading high-density bar codes, and/or over a range of heightened definition, relative to the HD or the ER ranges.

Thus, an example embodiment is described in relation to a method for adjusting a focus range of an optical apparatus such as a scanner. The method comprises activating a linear actuator operable for impelling a motion of a movable lens of the optical apparatus over a linear translational axis between a first position on the axis and a second position opposite therefrom. The first and the second positions each comprise limits of the motion of the movable lens in respective opposite directions over the axis.

The method also comprises selectively disengaging a stop actuator, in which the motion of the load is unconstrained between the first the second positions. Positioning the movable lens in the second position corresponds to operating the scanner in the HD focus range. Positioning the movable lens in the first position corresponds to operating the scanner in the ER focus range.

Further, the method comprises selectively engaging the stop actuator. The engaged stop actuator is operable for positioning the movable lens in at least an intermediate third position disposed along the axis between the first and the second positions. Positioning the movable lens in the intermediate position corresponds to operating the scanner in an SR focus range.

The switchably configurable material may comprise a dimorphic component of the stop actuator. The dimorphic component comprises a first shape corresponding to the disengaging step, and a second shape corresponding to the engaging step. The disengaging step and the engaging step respectively comprise switching the dimorphic component selectively between the corresponding first shape and the second shape.

The switchably configurable material may comprise an EAP. The EAP may comprise an electostrictive polymer. The selective switching of the EAP may relate to varying an electrostatic field in proximity to the dimorphic component using a piezoelectric mechanism.

Alternatively, the switchably configurable material may comprise an SMA. Selectively switching the SMA may relate to adjusting a deformation in a configuration of the dimorphic component using a thermomechanical mechanism.

Example embodiments of the present invention are thus described in relation to a system is disclosed for positioning a load in of multiple positions disposed over a linear axis. A linear actuator moves the load into each of the positions. A first position is at an end of the movement, with a second position opposite. A third position is intermediate between the first and the second positions. A stop actuator is made of a configurable material switchable selectively between an engaged configuration, in which the load is positioned in the at least third position, and a disengaged configuration, in which the load is freely movable between the first and the second positions.

To supplement the present disclosure, this application incorporates entirely by reference the following commonly assigned patents, patent application publications, and patent applications:
U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,526;
U.S. Pat. No. 8,798,367; U.S. Pat. No. 8,807,431;
U.S. Pat. No. 8,807,432; U.S. Pat. No. 8,820,630;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;

U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);

U.S. patent application Ser. No. 13/902,242 for a System For Providing A Continuous Communication Link With A Symbol Reading Device, filed May 24, 2013 (Smith et al.);

U.S. patent application Ser. No. 13/912,262 for a Method of Error Correction for 3D Imaging Device, filed Jun. 7, 2013 (Jovanovski et al.);

U.S. patent application Ser. No. 13/912,702 for a System and Method for Reading Code Symbols at Long Range Using Source Power Control, filed Jun. 7, 2013 (Xian et al.);

U.S. patent application Ser. No. 29/458,405 for an Electronic Device, filed Jun. 19, 2013 (Fitch et al.);

U.S. patent application Ser. No. 13/922,339 for a System and Method for Reading Code Symbols Using a Variable Field of View, filed Jun. 20, 2013 (Xian et al.);

U.S. patent application Ser. No. 13/927,398 for a Code Symbol Reading System Having Adaptive Autofocus, filed Jun. 26, 2013 (Todeschini);

U.S. patent application Ser. No. 13/930,913 for a Mobile Device Having an Improved User Interface for Reading Code Symbols, filed Jun. 28, 2013 (Gelay et al.);

U.S. patent application Ser. No. 29/459,620 for an Electronic Device Enclosure, filed Jul. 2, 2013 (London et al.);

U.S. patent application Ser. No. 29/459,681 for an Electronic Device Enclosure, filed Jul. 2, 2013 (Chaney et al.);

U.S. patent application Ser. No. 13/933,415 for an Electronic Device Case, filed Jul. 2, 2013 (London et al.);

U.S. patent application Ser. No. 29/459,785 for a Scanner and Charging Base, filed Jul. 3, 2013 (Fitch et al.);

U.S. patent application Ser. No. 29/459,823 for a Scanner, filed Jul. 3, 2013 (Zhou et al.);

U.S. patent application Ser. No. 13/947,296 for a System and Method for Selectively Reading Code Symbols, filed Jul. 22, 2013 (Rueblinger et al.);

U.S. patent application Ser. No. 13/950,544 for a Code Symbol Reading System Having Adjustable Object Detection, filed Jul. 25, 2013 (Jiang);

U.S. patent application Ser. No. 13/961,408 for a Method for Manufacturing Laser Scanners, filed Aug. 7, 2013 (Saber et al.);

U.S. patent application Ser. No. 14/018,729 for a Method for Operating a Laser Scanner, filed Sep. 5, 2013 (Feng et al.);

U.S. patent application Ser. No. 14/019,616 for a Device Having Light Source to Reduce Surface Pathogens, filed Sep. 6, 2013 (Todeschini);

U.S. patent application Ser. No. 14/023,762 for a Handheld Indicia Reader Having Locking Endcap, filed Sep. 11, 2013 (Gannon);

U.S. patent application Ser. No. 14/035,474 for Augmented-Reality Signature Capture, filed Sep. 24, 2013 (Todeschini);

U.S. patent application Ser. No. 29/468,118 for an Electronic Device Case, filed Sep. 26, 2013 (Oberpriller et al.);

U.S. patent application Ser. No. 14/055,234 for Dimensioning System, filed Oct. 16, 2013 (Fletcher);

U.S. patent application Ser. No. 14/053,314 for Indicia Reader, filed Oct. 14, 2013 (Huck);

U.S. patent application Ser. No. 14/065,768 for Hybrid System and Method for Reading Indicia, filed Oct. 29, 2013 (Meier et al.);

U.S. patent application Ser. No. 14/074,746 for Self-Checkout Shopping System, filed Nov. 8, 2013 (Hejl et al.);

U.S. patent application Ser. No. 14/074,787 for Method and System for Configuring Mobile Devices via NFC Technology, filed Nov. 8, 2013 (Smith et al.);

U.S. patent application Ser. No. 14/087,190 for Optimal Range Indicators for Bar Code Validation, filed Nov. 22, 2013 (Hejl);

U.S. patent application Ser. No. 14/094,087 for Method and System for Communicating Information in an Digital Signal, filed Dec. 2, 2013 (Peake et al.);

U.S. patent application Ser. No. 14/101,965 for High Dynamic-Range Indicia Reading System, filed Dec. 10, 2013 (Xian);

U.S. patent application Ser. No. 14/150,393 for Indicia-reader Having Unitary Construction Scanner, filed Jan. 8, 2014 (Colavito et al.);

U.S. patent application Ser. No. 14/154,207 for Laser Barcode Scanner, filed Jan. 14, 2014 (Hou et al.);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTIPURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al.);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTON CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.); and U.S. patent application Ser. No. 29/494,725 for an IN-COUNTER BARCODE SCANNER, filed Jun. 24, 2014 (Oberpriller et al.).

In the specification and/or figures, example embodiments of the invention have been described in relation to a process is described for scanning a scan target related to an electronic display or a print based graphic medium. An image of the scan target is captured over an exposure duration and with an illumination activated at a fixed lighting intensity level and for a set illumination duration. The set illumination duration corresponds to a mere fraction of the exposure duration. The illumination deactivates upon expiration of the illumination duration. A quality related characteristic of the captured image is evaluated relative to a target quality metric.

The present invention is not limited to such example embodiments. Embodiments of the present invention also relate to equivalents of the examples described herein. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

An example embodiment of the present invention relates to a system for positioning a load in of multiple positions disposed over a linear axis. A linear actuator moves the load into each of the positions. A first position is at an end of the movement, with a second position opposite. A third position is intermediate between the first and the second positions. A stop actuator is made of a configurable material switchable selectively between an engaged configuration, in which the load is positioned in the at least third position, and a disengaged configuration, in which the load is freely movable between the first and the second positions.

What is claimed, is:

1. A system operable for positioning a load in each of a plurality of positions disposed over a linear axis of a movement of the load, the system comprising:
  a linear actuator component operable for the movement of the load into each of the plurality of positions, which comprise:
    a first position disposed at a first end of the movement;
    a second position disposed at a second end of the movement, opposite from the first end;
    a plurality of intermediate positions disposed intermediately between the first position and the second position;

a stop actuator component comprising a configurable material switchable selectively between an engaged configuration, in which the load is positioned in any one of the plurality of intermediate positions, and a disengaged configuration, in which the movement is unconstrained between the first position and the second position; and a stop actuator linear positioning system operable for moving the stop actuator from a first position about the linear axis to at least one additional position about the liner axis, the number of positions about the linear axis for the stop actuator corresponding to the number of intermediate positions constituting the plurality of intermediate positions.

2. The linear positioning system as described in claim 1 wherein the switchably configurable material comprises a shape-memory alloy (SMA).

3. The linear positioning system as described in claim 2 wherein the SMA material comprises a formed gate structure.

4. The linear positioning system as described in claim 2 wherein the SMA material comprises a wire structure.

5. The linear positioning system as described in claim 1 wherein the switchably configurable material comprises an electroactive polymer (EAP).

6. The linear positioning system as described in claim 1 wherein the linear actuator component comprises a tiny ultrasonic linear actuator (TULA) device.

7. The linear positioning system as described in claim 1 wherein the load comprises a movable lens in a zoom focus element of an optical apparatus, the zoom focus element operable selectively over a standard focus range (SR), an extended focus range (ER), and an 'HD' focus range operable for high definition or near-field and far-field reading of high-density graphic data.

8. The linear positioning system as described in claim 7, wherein the zoom focus element comprises:
a first lens fixed in proximity to the second position; and
a second lens fixed in proximity to the first position.

9. The linear positioning system as described in claim 8, wherein:
upon a stop of the movable lens in the first position, the zoom element is operable over the ER focus range;
upon a stop of the movable lens in the second position, the zoom element is operable over the HD focus range; and
upon the stopping the motion of the load, fixedly, in any one of the plurality of intermediate positions, the zoom element is operable over the SR focus range.

10. An optical assembly adjustable selectively over at least three focus ranges, the optical assembly comprising:
a first lens fixed in proximity to a first position;
an image sensor-side lens fixed in proximity to a second position, which is disposed at an opposite end of a linear axis of the optical assembly from the first position;
a movable lens movable controllably over the linear axis between the first position and the second position; and
a system operable for positioning the movable lens in the first position, the second position, or any of a plurality of intermediate positions disposed between the first position and the second position, and comprising:
a linear actuator component operable for moving the movable lens over the linear axis;
a stop actuator component operable, selectively, for positioning the movable lens in any one of the plurality of intermediate positions, or for allowing the moveable lens to move freely between the first position and the second position, the stop actuator component comprising a material switchably configurable between an engaged configuration corresponding to the positioning of the movable lens in any one of the plurality of intermediate positions, or a disengaged position corresponding to allowing the moveable lens to move freely; and a stop actuator linear positioning system operable for moving the stop actuator from a first position about the linear axis to at least one additional position about the linear axis, the number of positions about the linear axis for the stop actuator corresponding to the number of intermediate positions constituting the plurality of intermediate positions.

11. The optical assembly as described in claim 10, wherein the optical assembly is operable, selectively, over one or more of:
an 'HD' range of high definition and near-field and far-field range reading of high-density graphic data corresponding to a positioning the movable lens in the second position;
an extended focus range (ER), corresponding to a positioning the movable lens in the first position; or
a standard focus range (SR) corresponding to a positioning the movable lens in any one of the plurality of intermediate positions.

12. The optical assembly as described in claim 10, wherein the linear actuator device comprises a tiny ultrasonic linear actuator (TULA).

13. The optical assembly as described in claim 10, the switchably configurable material comprises an electroactive polymer (EAP).

14. The optical assembly as described in claim 10, wherein the switchably configurable material comprises a shape-memory alloy (SMA).

15. The optical assembly as described in claim 14, wherein the SMA material comprises at least one of a formed gate structure, or a wire structure.

16. A method for adjusting a focus range of an optical apparatus, the method comprising the steps of:
activating a linear actuator operable for causing a motion of a movable lens of the optical apparatus over a linear axis between a first position on the linear axis and a second position opposite therefrom, the first position and the second position each comprising limits of the motion of the movable lens in opposite directions over the linear axis; and
disengaging a stop actuator, wherein the motion of the load is unconstrained between the first position and the second position; or
engaging the stop actuator, wherein the engaged stop actuator is operable for positioning the movable lens in any of a plurality of intermediate positions disposed between the first position and the second position, wherein engaging the stop actuator comprises activating a stop actuator linear positioning system operable for moving the stop actuator from a first position about the linear axis to at least one additional position about the linear axis, the number of positions for the stop actuator about the linear axis corresponding to the number of intermediate positions constituting the plurality of intermediate positions, and wherein the optical apparatus is operable over a plurality of focus ranges, the plurality of focus ranges comprising:
an 'HD' range of high definition and near-field and far-field range reading of high-density graphic data corresponding to a positioning the movable lens in the second position;

an extended focus range (ER), corresponding to a positioning the movable lens in the first position; and a standard focus range (SR) corresponding to a positioning the movable lens in any one of the plurality of intermediate positions.

17. The method as described in claim 16, wherein the switchably configurable material comprises a dimorphic component of the stop actuator, the dimorphic component comprising a first shape corresponding to the disengaging step and a second shape corresponding to the engaging step wherein the disengaging step and the engaging step respectively comprise switching the dimorphic component selectively between the corresponding first shape and the second shape.

18. The method as described in claim 17, wherein the switchably configurable material comprises an electroactive polymer (EAP) and wherein the selectively switching relates to varying an electrostatic field in proximity to the dimorphic component piezoelectrically.

19. The method as described in claim 17, wherein the switchably configurable material comprises a shape-memory alloy (SMA) and wherein the selectively switching relates to adjusting a deformation in a configuration of the dimorphic component thermomechanically.

* * * * *